No. 775,727. Patented November 22, 1904.

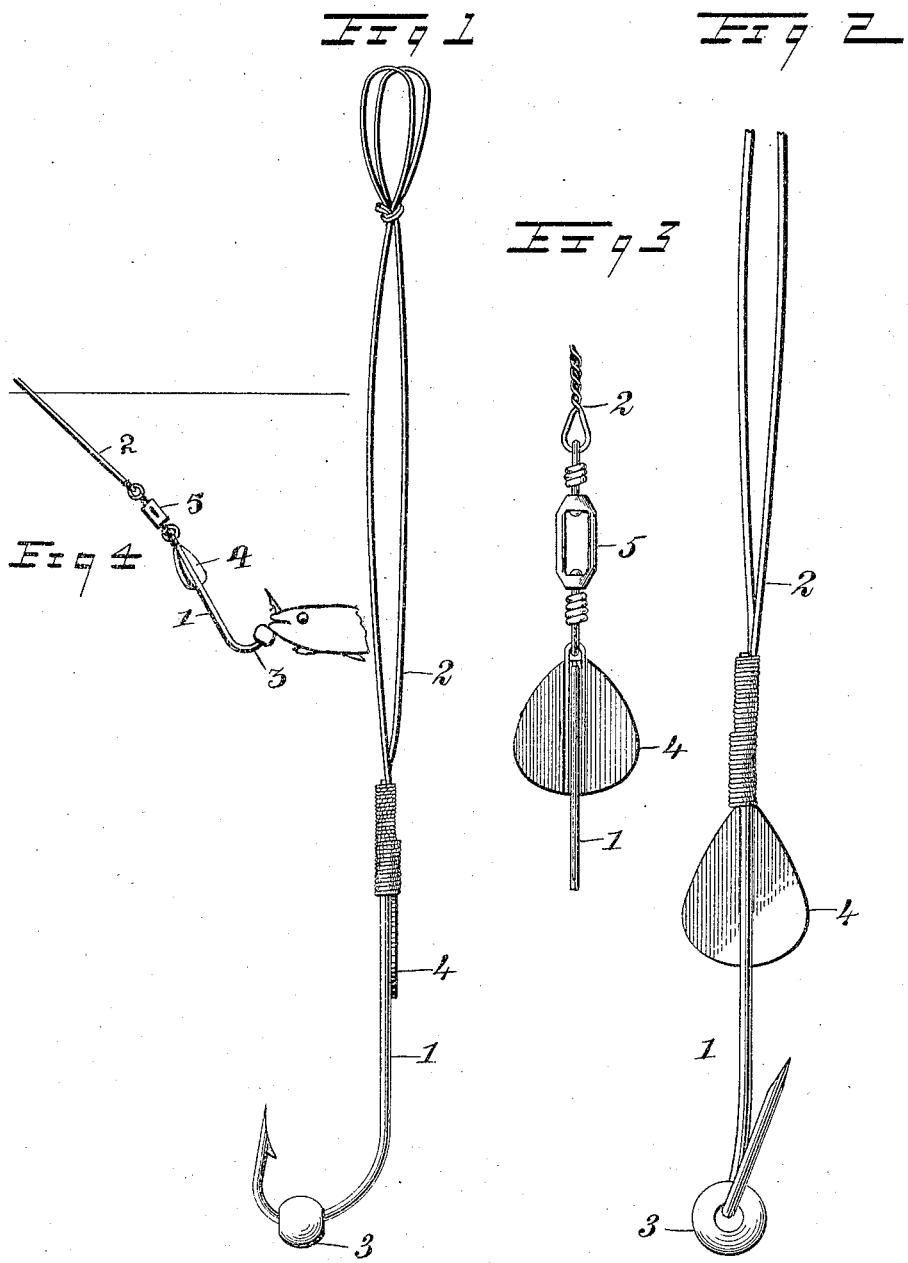

UNITED STATES PATENT OFFICE.

WILLIAM E. KOCH, OF WHITEHALL, NEW YORK.

FISH-HOOK.

SPECIFICATION forming part of Letters Patent No. 775,727, dated November 22, 1904.

Application filed April 27, 1904. Serial No. 205,076. (No model.)

*To all whom it may concern:*

Be it known that I, WILLIAM E. KOCH, a citizen of the United States, and a resident of Whitehall, in the county of Washington and State of New York, have invented a new and Improved Fish-Hook, of which the following is a full, clear, and exact description.

This invention relates to improvements in fish-hooks particularly adapted for using dead minnows as bait, although live bait may be used with it.

The object of the invention is to provide in connection with a hook a simple means for keeping the bait in proper position to simulate a live minnow—that is, with the back up when drawn through the water.

I will describe a fish-hook embodying my invention and then point out the novel features in the appended claims.

Reference is to be had to the accompanying drawings, forming a part of this specification, in which similar characters of reference indicate corresponding parts in all the figures.

Figure 1 is a side view of a hook embodying my invention. Fig. 2 is a plan view thereof. Fig. 3 shows a modification, and Fig. 4 indicates the position of parts when not in use.

Referring to the drawings, 1 designates the hook, here shown as connected to a leader 2 and arranged to slide on the hook, and along its shank is a weight 3, which will not only serve as a sinker, but will serve to keep the shank of the hook perpendicular. Attached to the shank of the hook is a plate 4, which, as here shown, is substantially ovate, with the larger end toward the end of the hook. The plane of the plate 4 is at right angles to the direction of bend of the hook, and therefore when the hook is drawn through the water after casting the friction of the plate on the water will hold the hook end upward while the shank is moving in a substantially vertical plane, and consequently the dead minnow on the hook will be held in a natural position, with its length substantially at right angles to the hook-shank, with the back up, and the plate will prevent undue lateral motion of the hook, which would tend to throw the bait on its side.

In Fig. 3 I have shown the leader as connected to the hook by means of a swivel 5, which allows the lead weight to incline the hook somewhat and tends to overcome the direct pull of the line, which would make the hook skitter over the water.

In the operation the hook is drawn through the water as in trolling or casting below the surface. The plate 4 is at right angles to the bend of the hook. The lead weight 3 inclines the hook, and the plate 4 is thereby also inclined against the direction in which the hook is traveling. The bait acts as a drag and keeps the point of the hook back from the direction in which the hook is being drawn. The forced inclination of the plate causes a pressure on its lower face by virtue of its being forced through the water, which pressure being equal on both sides of the shank prevents the hook from wabbling. The minnow is hooked through both lips, so that as long as the bend and point are vertical, or rather in vertical plane, the minnow stands up straight, and the forced inclination of the plate with its equal pressure on each side of its center-line causes the bend and point of the hook and minnow to float in the same continuous vertical plane, and thus keep the bait in natural position.

Having thus described my invention, I claim as new and desire to secure by Letters Patent—

1. A fish-hook, a weight thereon, and a plate secured to the shank of the hook at right angles to the direction of bend of the hook.

2. A fish-hook, a weight mounted to slide thereon, and a plate secured to the shank at right angles to the direction of bend of the hook.

3. A fish-hook, a weight mounted to slide thereon, and an ovate plate secured to the shank with its plane at right angles to the direction of bend of the hook, the larger end of the plate being toward the end of the hook.

4. A fish-hook, a weight thereon, a plate secured to the shank of the hook at right angles to the bend of the hook, and a swivel connected to the shank.

In testimony whereof I have signed my name to this specification in the presence of two subscribing witnesses.

WILLIAM E. KOCH.

Witnesses:
    FR. WILLIAM J. KOCH,
    JULIA M. KOCH.